US011973899B2

United States Patent
Massie et al.

(10) Patent No.: US 11,973,899 B2
(45) Date of Patent: Apr. 30, 2024

(54) EDGE APPLIANCES, METHODS, AND SYSTEMS FOR CLOUD EMERGENCY CALL MANAGEMENT SYSTEMS

(71) Applicant: MOTOROLA SOLUTIONS, INC., Chicago, IL (US)

(72) Inventors: Roy Massie, Hoover, AL (US); Troy A. Atwood, Spanish Fort, AL (US); David Weinrich, Temecula, CA (US); Todd M Morgan, Pelham, AL (US); Justin Mcateer, Toney, AL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 184 days.

(21) Appl. No.: 17/652,015

(22) Filed: Feb. 22, 2022

(65) Prior Publication Data
US 2023/0269329 A1 Aug. 24, 2023

(51) Int. Cl.
*H04M 3/51* (2006.01)
*H04L 41/0813* (2022.01)
*H04L 69/08* (2022.01)

(52) U.S. Cl.
CPC ....... *H04M 3/5116* (2013.01); *H04L 41/0813* (2013.01); *H04L 69/08* (2013.01)

(58) Field of Classification Search
CPC .. H04M 3/5116; H04L 41/0813; H04L 69/08; H04L 45/7453; H04L 49/354; H04L 65/1036; H04L 65/1053; H04L 65/1069; H04W 88/18; H04W 4/90; H04W 76/50
See application file for complete search history.

(56) References Cited

U.S. PATENT DOCUMENTS

| 9,462,444 | B1 * | 10/2016 | Fish | H04M 1/72421 |
| 10,264,122 | B1 * | 4/2019 | Jensen | H04W 76/50 |
| 10,582,053 | B2 * | 3/2020 | Jensen | H04L 69/22 |
| 10,659,427 | B1 | 5/2020 | Ratcliffe et al. | |
| 11,528,772 | B2 * | 12/2022 | Horelik | H04M 3/5183 |

(Continued)

FOREIGN PATENT DOCUMENTS

EP 1981257 A2 10/2008

OTHER PUBLICATIONS

The International Search Report and the Written Opinion, corresponding patent application No. PCT/us2023/011569 filed: Jan. 26, 2023, mailed Apr. 26, 2023.

*Primary Examiner* — Akelaw Teshale

(57) ABSTRACT

Systems, devices, and technical methods of the present disclosure use an edge appliance to facilitate seamless interoperability between a cloud emergency call management system and call-center systems that are situated onsite in an emergency call center. When an emergency call is received from a caller device, the CECMS routes the call to a call taker who may be working remotely on a telecommunication device. The CECMS transmits a duplicate of audio data and other data that is exchanged between the caller device and the telecommunication device during the call to the edge appliance. The edge appliance converts the audio data and the other data into formats that are compatible with the call-center systems and uses a virtual construct that represents the telecommunication device to transmit the converted data to the call-center systems through a network to which both the edge appliance and the call-center systems are connected.

20 Claims, 6 Drawing Sheets

(56) References Cited

U.S. PATENT DOCUMENTS

| | | |
|---|---|---|
| 2013/0297564 A1 | 11/2013 | Brenton et al. |
| 2020/0186646 A1* | 6/2020 | Meyerowitz .......... H04M 3/5116 |
| 2021/0243585 A1* | 8/2021 | Kothari ................... H04W 4/90 |
| 2021/0250442 A1* | 8/2021 | Jensen ................... H04W 76/50 |
| 2021/0320998 A1 | 10/2021 | Chalton et al. |
| 2021/0352460 A1* | 11/2021 | Rohde ................... H04M 3/5116 |
| 2022/0103995 A1* | 3/2022 | Horelik ............... H04W 68/005 |
| 2022/0210272 A1* | 6/2022 | Horelik ................ H04W 4/021 |

\* cited by examiner

_300_

301 — RECEIVE, IN A FIRST FORMAT AT AN EDGE APPLIANCE VIA A FIRST NETWORK FROM A CECMS, METADATA INDICATING THAT A CALL HAS BEEN ROUTED BY THE CECMS TO A TELECOMMUNICATION DEVICE THAT IS NOT CONNECTED TO A SECOND NETWORK, WHEREIN THE EDGE APPLIANCE IS CONNECTED TO BOTH THE FIRST NETWORK AND THE SECOND NETWORK

302 — GENERATE, AT THE EDGE APPLIANCE, A VIRTUAL CONSTRUCT THAT REPRESENTS THE TELECOMMUNICATION DEVICE WITHIN THE SECOND NETWORK

303 — GENERATE A MODIFIED VERSION OF THE METADATA BY CONVERTING THE METADATA FROM THE FIRST FORMAT TO A SECOND FORMAT

304 — TRANSMIT, VIA THE SECOND NETWORK AND THE VIRTUAL CONSTRUCT, THE MODIFIED VERSION OF THE METADATA TO A CALL-CENTER SYSTEM CONNECTED TO THE SECOND NETWORK

*FIG. 3A*

EDGE APPLIANCES, METHODS, AND SYSTEMS FOR CLOUD EMERGENCY CALL MANAGEMENT SYSTEMS

BACKGROUND

Emergency calls (e.g., 9-1-1 calls) may be routed to specialized call centers known as public safety answering points (PSAPs). Call takers answer the emergency calls, assess the nature of the emergencies being reported by those calls, and dispatch appropriate emergency-response personnel (e.g., police, firefighters, and paramedics) accordingly. Cloud-based solutions for handling and routing emergency calls have begun to be used in the industry in recent years. Such cloud-based solutions have the potential to leverage the vast computing resources available in the cloud to provide increased efficiency, streamlined workflows, increased scalability, and other advantages.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various examples of elements that are claimed, and to explain various principles and advantages of those examples.

FIG. 3*a* illustrates functionality for systems disclosed herein, according to one example.

Figure 1:
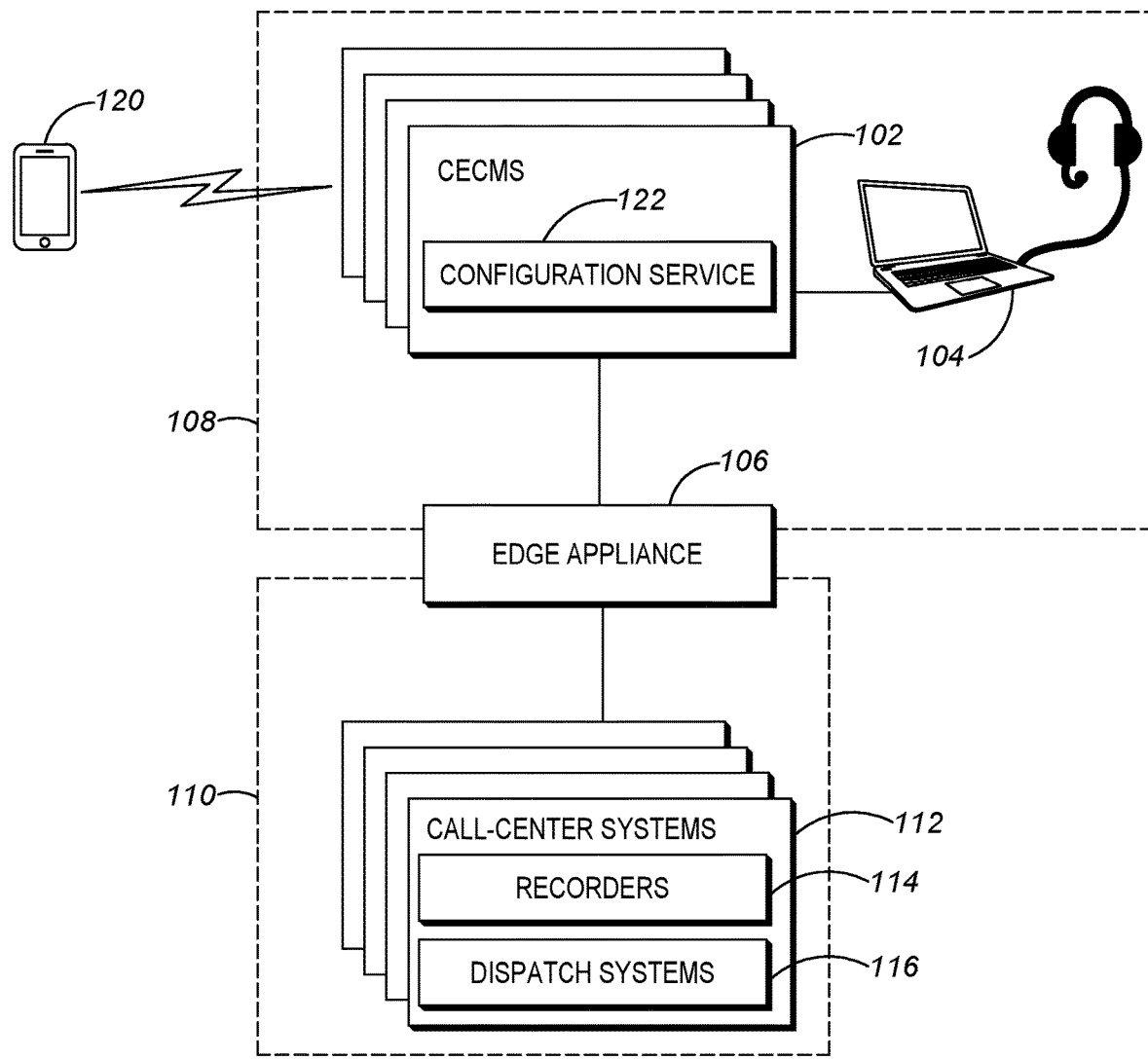
FIG. 1 illustrates a network environment in which systems described herein may operate, according to one example.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION

Cloud-based technologies have the potential to enhance the capacity, resilience, and upgradability of systems for handling emergency calls. Cloud-based systems also have the potential to enable call-takers to work from home or from other locations that are remote relative to call centers. In scenarios where pandemics or other exigent circumstances may render it imprudent or impractical for large numbers of call takers to work in close quarters at a single location, the ability for call takers to work remotely may be very valuable. For example, if call takers are able to work remotely, an emergency call center may be able continue to operate at full capacity despite any constraints on the number of call-takers that can work onsite. If the emergency call center is operating at full capacity, callers who urgently need lifesaving assistance are more likely to receive help in a timely fashion.

There are, however, some obstacles that can complicate the adoption of cloud-based call systems. Many emergency call centers are dependent on legacy systems to record emergency calls, dispatch emergency responders, and perform other functions. Many of these legacy systems include proprietary, highly specialized hardware that cannot be upgraded or replaced easily, but reliably performs valuable functions within such emergency call centers. Furthermore, attempts to upgrade or replace these legacy technologies too quickly may cause a call center's systems to become unreliable or unstable as bugs (which are common in newer technologies) and compatibility issues are discovered by trial and error. Unreliability and instability in an emergency call center could lead to disastrous consequences for people who are unlucky enough to place an emergency call when call-center systems are down. Many jurisdictions therefore have policies mandating that certain protocols be observed and that reliability levels meet certain criteria. It may be prudent to leave reliable legacy technologies that have been proven to perform functions well in place in many call centers for years so that replacement technologies can be introduced at a rate that is slow enough to prevent system instability. Legacy systems, however, will not last forever. Hardware may eventually fail and vendors may eventually stop offering support for legacy software and firmware. Furthermore, legacy systems typically cannot provide many of the advantages offered by cloud-based call handling systems. For example, many legacy systems cannot be easily adapted to allow call takers to work in locations other than the call centers in which those legacy systems are located.

Thus, there exists a need for technical methods, devices, and systems that can both allow legacy call-center systems to remain in place and allow cloud-based call handling systems to be used by emergency call centers. Systems, devices, and methods described herein provide an edge appliance that empowers call centers to harness the advantages provided by both legacy call-center systems and cloud-based call-handling systems without sacrificing reliability. Systems, devices, and methods described herein also describe a configuration service that can be used to keep the edge appliance up to date. Further advantages and features consistent with this disclosure will be set forth in the following detailed description with reference to the figures.

FIG. 1 illustrates a network environment 100 in which systems described herein may operate, according to one example. As shown, the network environment 100 includes a Cloud Emergency Call Management System (CECMS) 102. As will be recognized by persons of skill in the art, the CECMS 102 comprises a plurality of servers equipped with processors, memory, storage, and network interface cards (e.g., network server cards) through which the servers in the CECMS 102 can communicate with each other within the CECMS 102. The CECMS 102 may be configured to operate a digital or Internet Protocol (IP)-based 911 system in accordance with one or more industry standards (e.g., National Emergency Number Association (NENA i3) Next Generation 9-1-1). Persons of skill in the art will understand that any functionality attributed to the CECMS 102 may be executed using computing resources such as processors, memory, network interconnects, and storage that are distributed across multiple sites (e.g., in a cloud computing platform) and are interconnected via the network 108 (which may also comprise multiple smaller networks).

In addition, the CECMS 102 can communicate with the telecommunication device 104 and the edge appliance 106 via the network 108. The network 108 may comprise a wide area network (WAN) such as the Internet.

The telecommunications device 104 may comprise a computer (e.g., a workstation, a laptop, a mobile tablet, or a desktop computer) that is equipped with peripherals for answering calls (e.g., a headset comprising headphones and a microphone) through a protocol such as Voice over Internet Protocol (VoIP). The edge appliance 106 may comprise one or more servers equipped with processors, memory, storage, and network interface cards through which the edge appliance 106 can communicate via both the network 108 and the network 110.

The network 110 may comprise a private branch exchange (PBX) telephone network (e.g., as one of the call-center systems 112), a local area network (LAN), an enterprise network, a virtual private network (VPN), an Integrated Services Digital Network (ISDN) (e.g., which can transfer voice, video, and data over a digital connection), some other type of digital or analog communication network, or a combination thereof. The network 110 may be a private network for an Emergency Communications Center (ECC) (e.g., A Public Safety Answering Point (PSAP)). The ECC may be operated by an entity that is tasked with handling emergency calls, such as a governmental communication agency, a public or private police department, a fire department, an airport, or a hospital.

The edge appliance 106 may act as a network relay through which network communications to and from the call-center systems 112 pass. The call-center systems 112 may comprise various types of hardware that are connected to the network 110. For example, the call-center systems 112 may include recorders 114, dispatch systems 116, computing devices of various types (e.g., servers, door controllers, camera-control systems, status-light controllers, workstations, desktop computers, laptop computers, network routers, network switches, and network storage devices), status light poles, a private branch exchange (PBX), and other hardware that facilitates operations performed by an ECC. The dispatch systems 116 may comprise one or more dispatch servers or dispatch consoles (e.g., proprietary dedicated hardware units or computing devices configured to function as dispatch servers or consoles). The recorders 114 may comprise a logging recorder (e.g., a device that can record, store, and play back both inbound and outbound communications handled within the network 110) that can record audio or visual input from multiple sources concurrently.

The recorders 114 may comprise any combination of modern recording devices (e.g., servers configured to function as recorders via specialized software) or legacy recording devices that record on mediums such as digital tape, analog tape, cassettes, microcassettes, or Video Home System (VHS) tapes. Some legacy recording devices may use reel-to-reel tape to record multiple phone lines via multiple tracks on the tape, while others may use individual cassette or microcassette recorders for each individual phone line. Some legacy recording devices may record concurrent phone calls onto a single VHS tape. The recorders 114 may also comprise more modern recording devices that use digital tape or recordable disks for storage. The recorders 114 may also comprise servers or other computers that use hardware such as sound cards and specialized software programs to record telephone calls or other media from other sources such as cameras or radios.

The recorders 114 may be configured to perform trunk-side recording via connections to trunk phone lines (e.g., phone lines that connect the network 110 to external telephone lines) such as Plain Old Telephone Service (POTS) lines, Transmission System 1 (T1) lines, European 1 (E1) lines, Session Initiation Protocol (SIP) lines (which allow telephone operations to be performed over an Internet connection and can also transfer media data), or Voice over Internet Protocol (VoIP) lines. The recorders 114 may also be configured to perform extension-side recording via connections to extension phone lines (e.g., the phone lines that connect devices within the network 110 to the network 110).

The recorders 114 may be configured to record media data (e.g., voice data and other audio data, video data, still images, and other data displayed to call takers via screens or communicated to call takers via speakers) and metadata about calls that are recorded. Metadata such as start timestamps for calls, stop timestamps for calls, extension numbers, caller identification (Caller ID) data (e.g., such as telephone numbers from which calls originate and names associated therewith), an indication of a caller's current geographical location (e.g., Global Positioning System (GPS) coordinates or a street address), a class of telephony service for a call, a name of a telephone carrier for a call, Dual Tone Modulated Frequency (DTMF) tones dialed, Dial Number Identification Service (DNIS) information, and other data may be recorded.

As one illustrative example of how the system shown in the network environment 100 may operate in practice, consider the following scenario. Suppose a caller places an emergency call (e.g., a 911 call) via the caller device 120. The caller device may be, for example, a cellular phone (e.g., a smart phone), a satellite phone, a Voice over Internet Protocol (VoIP) phone, a landline telephone, or even one of the types of telecommunication devices listed above. The CECMS 102 routes the call to the telecommunication device 104 and transmits metadata and a media stream (e.g., comprising an audio signal and possibly a video signal) associated with the call to the telecommunication device 104 via the network 108. Note that an audio signal captured by a microphone at the caller device 120 may be included in the media stream even if the call has not yet been answered. The telecommunication device 104 may be geographically remote relative to an ECC in which the call-center systems 112 and the edge appliance 106 are located. As a result, if the recorders 114 and the dispatch systems 116 are configured to operate within the network 110, the recorders 114 and the dispatch systems 116 may not be able to capture the metadata and the media stream that are sent to the telecommunication device 104 via the network 110. The CECMS 102 therefore sends a copy of the metadata and the media stream to the edge appliance 106 via the network 108.

Upon receiving the metadata (or beforehand), the edge appliance 106 generates a virtual construct (e.g., a software construct that functions as a virtual version of the telecommunication device) that represents (e.g., emulates, imitates, or mirrors) the telecommunication device 104 within the network 108 such that it appears to the call-center systems 112 that the telecommunication device 104 is connected to the network 110 and is receiving the call through the network 110. The metadata and the media stream that are received by the edge appliance 106 may be in formats that are compatible with the CECMS 102. However, those formats might not be compatible with the call-center systems 112. To alleviate this problem, the edge appliance 106 converts the metadata into one or more additional formats that are compatible with the call-center systems 112, thereby creating one or more modified versions of the metadata. Similarly, the edge appliance 106 may also convert the media stream into one or more additional formats that are compatible with the call-center systems 112, thereby creating one or more modified versions of the media stream. Once these modified versions of the metadata and the media stream have been created, the edge appliance 106 transmits the modified versions to the corresponding call-center systems 112 that are compatible with those modified versions, respectively. The edge appliance 106 transmits the modified versions via the network 110 through the guise of the virtual construct such that the call-center systems 112 can operate seamlessly as though the telecommunication device 104 were connected to the network 110. This allows the call-center systems 112 to function normally as they would if the telecommunication device 104 were actually receiving the call through the network 110 rather than through the network 108.

Persons of skill in the art will appreciate that various methods for generating the virtual construct may be used. For example, the virtual construct may comprise a virtual machine or a cloud computing container which extends the software design used in the CECMS 102 into the edge appliance 106 and provides an interface matching the telecommunications device 104. In this example, the CECMS 102 may interact with the edge appliance 106 as if the edge appliance 106 were just one of many services that are a part of the CECMS 102 itself and that happens to be accessed through another network link within the CECMS 102. In another example, the virtual construct may comprise an emulator rather than a virtual machine or a container. In either case, the virtual construct may use the connection of the edge appliance 106 to the network 110 to transmit data in compatible formats to the call-center systems 112.

The edge appliance 106 may be apprised of the additional formats that are compatible with the call-center systems 112 via a configuration service 122 (which may be part of the CECMS 102 or may be a separate cloud system). The configuration service 122 may comprise software that uses a data structure (e.g., a hash) that associates an identifier of the edge appliance 106 with the entity that controls the call-center systems 112. The configuration service 122 may further comprise software that uses a data structure (e.g., a hash) that associates the entity with the data formats that are compatible the call-center systems 112. The entity may provide a list of these compatible formats, a list of device types included in the call-center systems, or a list of software programs that execute on the call-center systems 112 to the configuration service 122 manually, if desired. The edge appliance 106 may also compile the list of device types and the list of software programs by querying those of the call-center systems 112 that are capable of providing this information directly (although some legacy device might not support such functionality) via the network 110. The edge appliance 106 may push such compiled lists to the configuration service 122 via the network 108. In either case, the edge appliance 106 may be configured to pull a list of the data formats that are compatible with the call-center systems 112 from the configuration service 122 via the network 108 periodically or whenever the edge appliance 106 detects that a new device has been added to the network 110 or that the software running on one of the call-center systems 112 has been updated. The edge appliance 106 may also send a notification to alert an administrator if the edge appliance 106 detects that there is currently no software on the edge appliance 106 that can convert data received from the CECMS 102 to one of the formats on the list of compatible data formats.

When a media stream for a call begins to flow from the caller device 120 (e.g., because the caller is speaking or transmitting video), the CECMS 102 transmits a duplicate of the media stream to the edge appliance 106 via the network 108. This may occur even before the call taker answers the call at the telecommunication device 104. In one example, the caller may be speaking or providing background sounds from the caller device 120 while the caller waits for the call-taker to answer at the telecommunication device 104. During this wait time, the metadata and the media stream (e.g., comprising audio data and video data) is transmitted to the edge appliance 106 via the network 108. In another example, suppose a media stream that includes both an audio signal and a video stream is being transmitted between the telecommunication device 104 and the caller device 120 as the call proceeds. The CECMS 102 will transmit a digital/IP duplicate of the audio signal and a digital/IP duplicate of the video stream to the edge appliance 106 via the network 108. The edge appliance 106 will generate one or more modified versions of the audio signal by converting the audio signal into one or more formats that are compatible with the call-center systems 112 (e.g., the recorders 114). The edge appliance 106 will also generate one or more modified versions of the video stream by converting the video stream into one or more formats that are compatible with the call-center systems 112. Next, the edge appliance 106 will transmit the modified versions of the audio signal and the video stream to the call-center systems 112 via the network 110 through the guise of the virtual construct. When the call ends (e.g., when the call taker hangs up from the telecommunication device 104), the CECMS 102 ends the connection between the caller device 120 and the telecommunication device 104 and transmits the remainder of the call metadata (e.g., a stop timestamp) to the call-center systems 112 via the network 110 through the guise of the virtual construct.

For simplicity, FIG. 1 illustrates a single network (the network 110) in which call-center systems 112 are situated. However, in some examples, a single edge appliance (such as the edge appliance 106) may perform the functions described herein for multiple call centers in parallel and may therefore be connected to multiple private networks that correspond to those call centers.

By operating in the manner described above, the system shown in the network environment 100 provides numerous advantages over existing solutions for emergency call systems. For example, the system described above empowers entities tasked with handling emergency calls to avail themselves of the benefits offered by cloud-based 911 systems, such as the capacity for call takers to work remotely (e.g., during pandemic lockdowns), a reduction in costs associated with purchasing and maintaining call-center hardware, an increase in system scalability, a reduction in maintenance down time, and an increased capacity to integrate with other modern systems. In addition, the system described above also empowers entities to circumvent the legacy-compatibility issues that affect cloud-based 911 systems and the disadvantages that often accompany newer technologies (e.g., frequent bugs). In the system described above, reliable legacy systems that have already been thoroughly debugged and refined through years of use can continue to function without being subjected to expensive upgrades or updates that might introduce new bugs. At emergency call centers, calls in which lives are on the line and time is of the essence are received on a daily basis. Software bugs, network latency, and other delay-causing issues that might be minor annoyances in other domains could be catastrophic in 911 systems. It is therefore difficult to overstate how valuable the reliability and predictability that legacy systems can provide may be for an emergency call center.

Furthermore, the system described above consumes much less bandwidth than would be consumed if the conversions to legacy-compatible formats were performed in the cloud rather than by the edge appliance 106. Even if the conversions could be performed quickly in the cloud, multiple versions of the same data (e.g., one version per legacy device) would have to be transmitted via the network 108—which may cover a large geographical area and may have a data transfer rate that is much lower than the data transfer rates that can be achieved in smaller local networks. By contrast, if the conversions are performed at the edge appliance 106 as explained above, a single version of the data may be transferred via the network 108. That single version of the data may be represented in a highly efficient compressed format without regard for compatibility concerns rather than in a legacy-compatible format that is likely to be relatively inefficient. The versions of the data that are generated at the edge appliance 106 and are in the legacy-compatible formats can be transmitted to the call-center systems 112 via the network 110 (which, in some instances, may be smaller and have higher data transfer rates than the network 108). Thus, using the edge appliance 106 to perform the conversions into legacy-compatible formats makes bandwidth-related delays less likely. Even the ability for call takers and other call-center employees to continue using familiar legacy interfaces may be helpful, since call takers will likely be able to navigate more quickly through familiar interfaces than through unfamiliar new interfaces.

The system described above also reduces the complexity that would result if the conversions to legacy-compatible formats were performed in the cloud. In the system described above, the CECMS 102 can communicate in a single data format with multiple edge appliances situated at multiple call centers even if those call centers include vastly disparate legacy call-center systems. As a result, the system empowers a single CECMS to support many different call centers operated by many different entities. Note that, in some examples, a single edge appliance may also be able to support multiple call centers that use multiple networks. The number of call centers that can be supported by a particular edge appliance may depend on a number of factors (e.g., the type and amount of hardware used in the edge appliance, the number of different legacy systems in each call center to be supported, and the geographical distance between the call centers).

Figure 2:
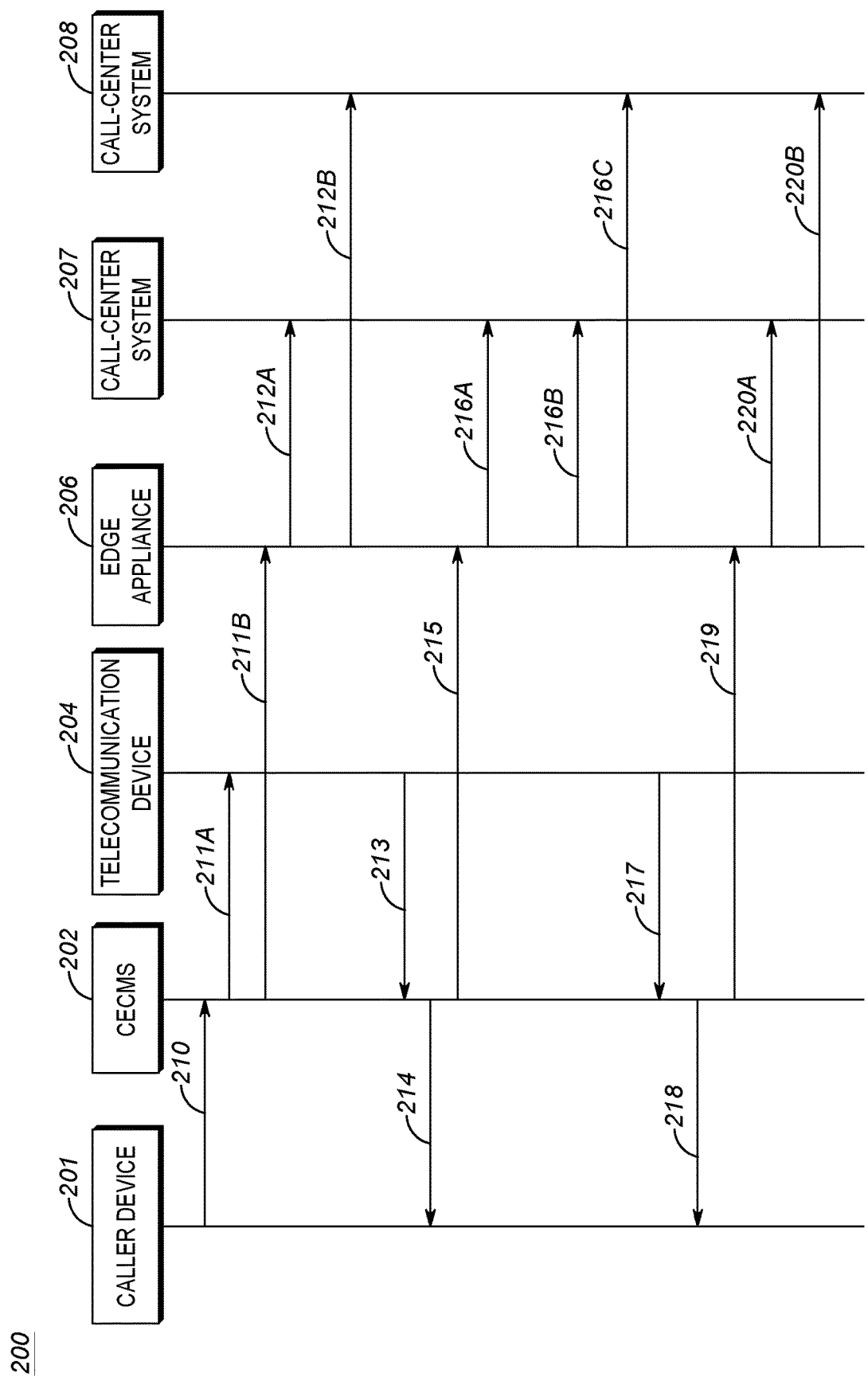
FIG. 2 includes a diagram that shows an illustrative example of a sequence of network communications that may occur in systems of the present disclosure.

FIG. 2 includes a diagram 200 that shows an illustrative example of a sequence of network communications that may occur in systems of the present disclosure. In the diagram 200, two call-center systems (call-center system 207 and call-center system 208) are shown. However, persons of skill in the art will understand that more or fewer call-center systems may be used without departing from the spirit and scope of this disclosure. Similarly, more or fewer network communications than those shown may be used.

In this example, the CECMS 202 may communicate with the telecommunication device 204 and the edge appliance 206 via a first network. The edge appliance 206 may communicate with the call-center system 207 and the call-center system 208 via a second network. The caller device 201 may communicate with the CECMS 202 via the first network or via an additional network such as a Public-Switched Telephone Network (PSTN), a cellular network, or some other type of network through which telephonic communications may be transmitted.

At arrow 210, the caller device 201 initiates a phone call that is received by the CECMS 202. At arrow 211a, the CECMS 202 transmits metadata for the call to the telecommunication device 204 in a first format to indicate that the phone call is being routed to the telecommunication device 204. In addition, the CECMS 202 may also commence transmitting a media stream (e.g., comprising audio captured by a microphone at the caller device 201) to the telecommunication device 204 at arrow 211a. At arrow 211b (which may occur concurrently with arrow 211a), the CECMS 202 transmits a duplicate of the metadata (and, if applicable, the media stream) to the edge appliance 206. The edge appliance 206 generates a first modified version of the metadata by converting the metadata into format that is compatible with the call-center system 207 and generates a second modified version of the metadata by converting the metadata into a format that is compatible with the call-center system 208. The edge appliance 206 may also generate one or more modified versions of the media stream by converting the media stream into one or more additional formats. The edge appliance 206 also generates a virtual construct that represents the telecommunication device 204 (note that, in some examples, the virtual construct may also have been generated before the call was received).

Next, at arrow 212a, the edge appliance 206 transmits the first modified version of the metadata (and, if applicable, a modified version of the media stream) to the call-center system 207 via the virtual construct. At arrow 212b (which may occur concurrently with arrow 212a), the edge appliance 206 transmits the second modified version of the metadata (and, if applicable, a modified version of the media stream) to the call-center system 208 via the virtual construct.

At arrow 213, a call taker associated with the telecommunication device 204 answers the call and an indication that the call has been answered is transmitted to the CECMS 202. At arrow 214, the CECMS 202 transmits an indication that the call has been answered to the caller device 201 and establishes a connection through which the telecommunication device 204 and the caller device 201 can exchange data (e.g., audio data and other media data); communications exchanged between telecommunication device 204 and the caller device 201 via the connection are relayed through the CECMS 202 (e.g., in the form of a media stream).

Next, media data proceeds to be exchanged via the connection between the telecommunication device 204 and the caller device 201 as a caller and a call-taker speak to one another. At arrow 215, the CECMS 202 transmits a duplicate of the media data that is exchanged via the connection to the edge appliance 206. The transmission of the duplicate media data from the CECMS 202 to the edge appliance 206 may continue in parallel with the transmission of the media data that is exchanged via the connection between 201 and 204. In addition, upon receiving the duplicate media data, the edge appliance 206 may generate modified versions of the duplicate media data by converting the duplicate media data into formats that are compatible with the call-center system 207 and the call-center system 208, respectively. For example, suppose the duplicate media data comprises both audio data and video data. Also suppose that the call-center system 207 is configured to receive both audio data and a video data, but that the call-center system 208 is configured to receive audio data alone. In this example, at arrow 216a, the edge appliance 206 transmits a version of the audio data that is in a format compatible with the call-center system 207 to the call-center system 207. Similarly, at arrow 216b, the edge appliance 206 transmits a version of the video data that is in a format compatible with the call-center system 207 to the call-center system 207. In addition, at arrow 216c, the edge appliance 206 transmits a version of the audio data that is in a format compatible with the call-center system 208 to the call-center system 208. The actions indicated by arrow 215, arrow 216a, arrow 216b, and arrow 216c may proceed concurrently while the call continues.

At arrow 217, the CECMS 202 receives an indication from the telecommunication device 204 that the call has been ended. Next, at arrow 218, the CECMS 202 transmits an indication that the call has ended to the caller device 201. (Note that the call may also be terminated by the caller device 201 in a similar fashion if the caller hangs up.) The CECMS 202 closes the connection between the telecommunication device 204 and the caller device 201. At arrow 219, the CECMS 202 transmits an indication that the call has ended to the edge appliance 206. At arrow 220a, the edge appliance 206 transmits an indication that the call has ended to the call-center system 207 in a format that is compatible with the call-center system 207. Similarly, at arrow 220b (which may be concurrent with arrow 220a), the edge appliance 206 transmits an indication that the call has ended to the cell-center system 208 in a format that is compatible with the call-center system 208.

FIG. 3a illustrates functionality 300 for systems disclosed herein, according to one example. The functionality 300 does not have to be performed in the exact sequence shown. Also, various blocks may be performed in parallel rather than in sequence. Accordingly, the elements of the functionality 300 are referred to herein as "blocks" rather than "steps." The functionality 300 can be executed as instructions on a machine (e.g., by one or more processors), where the instructions are stored on a transitory or non-transitory computer-readable storage medium. While only four blocks are shown in the functionality 300, the functionality 300 may comprise other actions described herein. Also, in some examples, some of the blocks shown in the functionality 300 may be omitted without departing from the spirit and scope of this disclosure.

As shown in block 301, the functionality 300 includes receiving, in a first format at an edge appliance via a first network from a cloud emergency call management system (CECMS), metadata indicating that a call has been routed by the CECMS to a telecommunication device that is not connected to a second network, wherein the edge appliance is connected to both the first network and the second network. In one example, the first format is Javascript Object Notation (JSON). In other examples, the first format may be a compressed format or some other type of format. For example, the first format may be compressed by a technique such as Huffman coding so that the metadata uses a reduced amount of memory or storage space. In one example, the first network may be a WAN and the second network may be a LAN, an enterprise network, or a PBX network.

The metadata may comprise, for example, a start timestamp for the call, caller identification (Caller ID) data (e.g., such as telephone numbers from which calls originate and names associated therewith), an indication of the caller's current geographical location (e.g. GPS coordinates or a street address), the class of telephony service for the call, the name of the telephone carrier for the call, Dual Tone Modulated Frequency (DTMF) tones dialed at a caller device, or Dial Number Identification Service (DNIS) information.

The functionality 300 may also include receiving, in a first format at the edge appliance via the first network from the CECMS, media data for the call.

As shown in block 302, the functionality 300 includes generating, at the edge appliance, a virtual construct that represents the telecommunication device within the second network. The telecommunication device and the virtual construct may be associated with a call taker who is designated to respond to the call by the CECMS.

As shown in block 303, the functionality 300 includes generating a modified version of the metadata by converting the metadata from the first format to a second format. In one example, the second format may be a dispatch format such as an Automatic Location Information (ALI) dispatch format or a NENA Emergency Incident Data Object (NENA EIDO) dispatch format. Standardized dispatch formats are often configured by the jurisdictions in which ECCs operate.

The functionality 300 may further include generating a modified version of the media data by converting the media data from a first additional format to a second additional format. The first additional format may be, for example, Advanced Audio Coding (AAC), Moving Picture Experts Group (MPEG), MPEG Audio Layer III (MP3), Waveform Audio Format (WAV), Audio Interchange File Format (AIFF), Windows Media Audio (WMA), Audio/Video Interleaved (AVI), or some other type of format for audio data or video data. The second additional format may be, for example, Pulse Code Modulation (PCM), Bitstream (RAW), or some other type of format for audio data or video data.

The functionality 300 may also include, prior to generating the modified version of the metadata, transmitting, via the first network, an identifier that identifies the edge appliance to a configuration service; and receiving, via the first network in response to the identifier, data indicating that the call-center system connected to the second network is configured to receive the metadata in the second format. The functionality may further include receiving, via the first network, data indicating that the call-center system connected to the second network is configured to receive the media data in the second additional format. The configuration service may be a component of the CECMS that includes a data structure that associates edge appliance identifiers with metadata formats and media data formats that are compatible with call-center systems served by the edge appliances identified by the edge appliance identifiers.

As shown in block 304, the functionality 300 includes transmitting, via the second network and the virtual construct, the modified version of the metadata to a call-center system connected to the second network. The call-center system may be, for example, a dispatch system (e.g., a dispatch server or a dispatch console), a recorder, a private branch exchange (PBX), a camera-control system, a statuslight controller, or a door controller. The functionality 300 may further include transmitting, via the second network and the virtual construct, the modified version of the media data to the call-center system connected to the second network.

The functionality 300 may also include generating an additional modified version of the metadata by converting the metadata from the first format into a third format; and transmitting, via the second network, the additional modified version of the metadata to an additional call-center system connected to the second network.

Figure 3B:
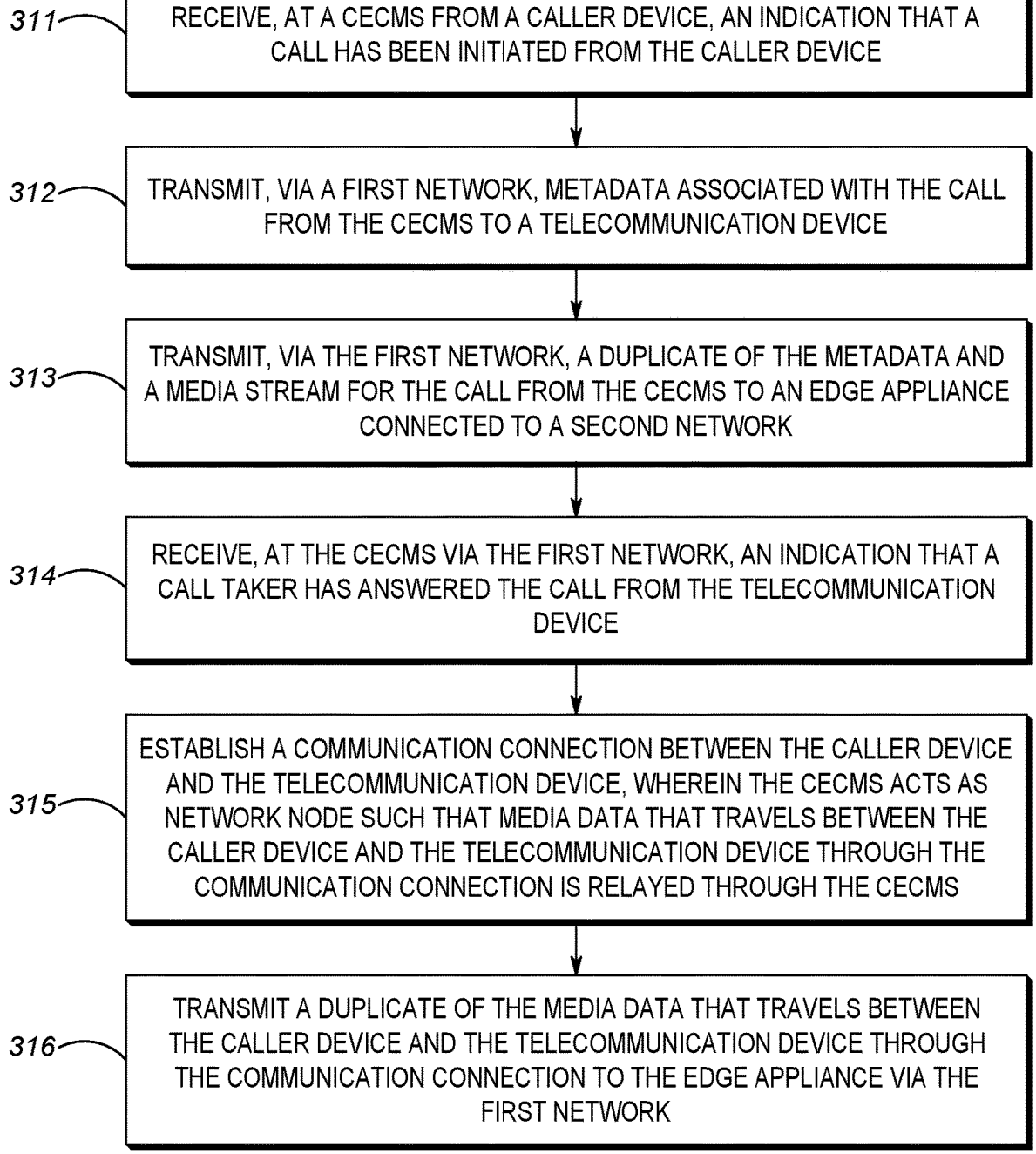
FIG. 3*b* illustrates additional functionality for systems disclosed herein, according to one example.

FIG. 3b illustrates additional functionality 310 for systems disclosed herein, according to one example. The functionality 310 does not have to be performed in the exact sequence shown. Also, various blocks may be performed in parallel rather than in sequence. Accordingly, the elements of the functionality 310 are referred to herein as "blocks" rather than "steps." The functionality 310 can be executed as instructions on a machine (e.g., by one or more processors), where the instructions are stored on a transitory or non-transitory computer-readable storage medium. While only six blocks are shown in the functionality 310, the functionality 310 may comprise other actions described herein. Also, in some examples, some of the blocks shown in the functionality 310 may be omitted without departing from the spirit and scope of this disclosure.

As shown in block 311, the functionality 310 includes receiving, at a cloud emergency call management system (CECMS) from a caller device, an indication that a call has been initiated from the caller device.

As shown in block 312, the functionality 310 includes transmitting, via a first network, metadata associated with the call from the CECMS to a telecommunication device. The metadata may include, for example, a start timestamp for the call, caller identification (Caller ID) data (e.g., such as telephone numbers from which calls originate and names associated therewith), an indication of the caller's current geographical location (e.g. GPS coordinates or a street address), the class of telephony service for the call, the name of the telephone carrier for the call, Dual Tone Modulated Frequency (DTMF) tones dialed at a caller device, or Dial Number Identification Service (DNIS) information.

As shown in block 313, the functionality 310 includes transmitting, via the first network, a duplicate of the metadata and a media stream for the call from the CECMS to an edge appliance connected to a second network.

As shown in block 314, the functionality 310 includes receiving, at the CECMS via the first network, an indication that a call taker has answered the call from the telecommunication device.

As shown in block 315, the functionality 310 includes establishing a communication connection between the caller device and the telecommunication device, wherein the CECMS acts as network node such that media data that travels between the caller device and the telecommunication device through the communication connection is relayed through the CECMS.

As shown in block 316, the functionality 310 includes transmitting a duplicate of the media data that travels between the caller device and the telecommunication device through the communication connection to the edge appliance via the first network.

The functionality 310 may also include receiving, via the first network, an identifier that identifies the edge appliance to a configuration service associated with the CECMS; and transmitting, via the first network in response to receiving the identifier, data indicating that a call-center system connected to the second network is configured to receive the metadata in a specific format. The call-center system may comprise, for example, a recorder, a dispatch console, a private branch exchange (PBX), a camera-control system, a status-light controller, or a door controller.

Similarly, the functionality 310 may also include receiving, via the first network, an identifier that identifies the edge appliance to a configuration service associated with the CECMS; and sending, via the first network, data indicating that a call-center system connected to the second network is configured to receive the media data in a specific format. The call-center system may be, for example, a recorder or a dispatch console.

Figure 4:
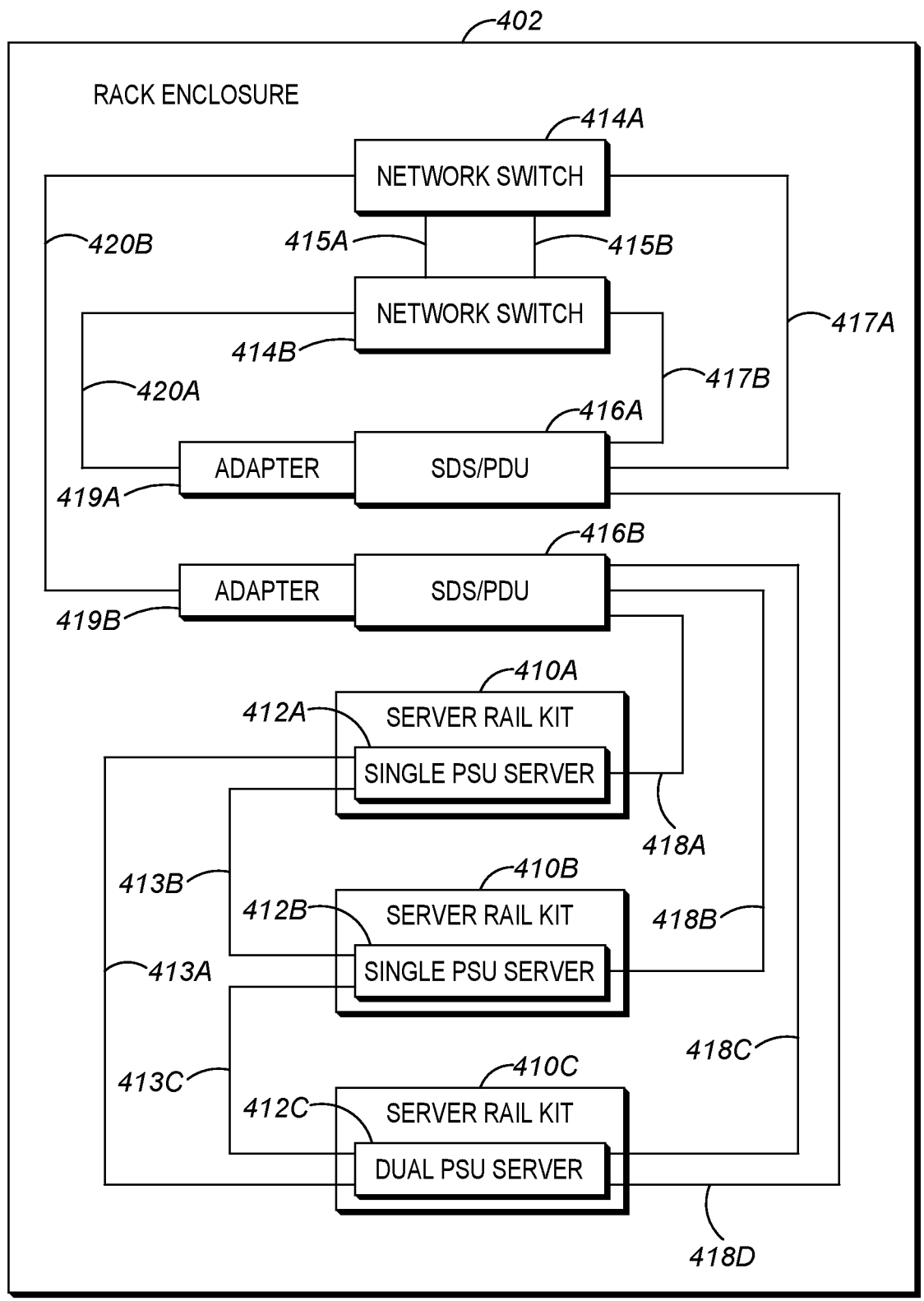
FIG. 4 illustrates a block diagram of an edge appliance, according to one example.

FIG. 4 illustrates a block diagram of an edge appliance 400, according to one example. Components of the edge appliance 400 may be housed in the rack enclosure 402. The rack enclosure 402 may be made of metal (e.g., steel) and may include hardware (e.g., screws, nuts, and washers) for mounting the rack enclosure 402 to a wall. The rack enclosure 402 may also comprise a door mounted on hinges such that the door can be opened to provide access to components housed within the rack enclosure 402. The rack enclosure 402 may further comprise a lock for securing the door when the door is closed. One or more sides of the rack enclosure 402 may comprise vents through which air can flow to ensure that components housed within the rack enclosure 402 are sufficiently ventilated (e.g., for components that are configured to be air-cooled).

The server rail kit 410a, the server rail kit 410b, and the server rail kit 410c may be seated (e.g., mounted) within the rack enclosure 402 to facilitate seating the single power-supply-unit (PSU) server 412a, the single PSU server 412b, and the dual PSU server 412c, respectively, within the rack enclosure 402. The single PSU server 412a, the single PSU server 412b, and the dual PSU server 412c may be 1 U rack-mount servers (i.e., one Rack-Unit (RU) servers that are 1.75 inches thick). Each of the single PSU server 412a, the single PSU server 412b, and the dual PSU server 412c may comprise, for example, thirty-two gigabytes of memory (e.g., contained in one or more dual in-line memory modules (DIMMs)), seven hundred twenty gigabytes of storage (e.g., contained one or more hard disk drives (HDDs) or solid state drives (SSDs)), at least one trusted platform module (TPM), a motherboard, and one or more processors. The single PSU server 412a, the single PSU server 412b, and the dual PSU server 412c may be connected to each other via the direct attach copper (DAC) enhanced small form-factor pluggable (SFP+) cable 413a, the DAC SFP+ cable 413b, and the DAC SFP+ cable 413c as shown.

In addition, the network switch 414a and the network switch 414b may be seated within the rack enclosure 402. The network switch 414a and the network switch 414b may have both media access control (MAC) address tables and Internet protocol (IP) routing tables and may be configured to handle both intra-virtual local area network (intra-VLAN) communication and packet routing between different VLANs (i.e., the network switch 414a and the network switch 414b may be layer 3 switches). The network switch 414a and the network switch 414b may each comprise at least one processor and one or more DIMMs. The DAC SFP+ cable 415a and the DAC SFP+ cable 415b connect the network switch 414a to the network switch 414b.

The edge appliance 400 may further comprise two units that combine a serial device server (SDS) and a power distribution unit (PDU) into a single chassis (i.e., an SDS/PDU). Specifically, the SDS/PDU 416a and the SDS/PDU 416b may be seated in the rack enclosure 402. In the example shown, the power cord 417a and the power cord 417b connect the SDS/PDU 416a to the network switch 414a and the network switch 414b, respectively, such that the SDS/PDU 416a can provide power to the network switch 414a and the network switch 414b. Furthermore, the power cord 418a and the power cord, the power cord 418b, and the power cord 418c may connect the SDS/PDU 416b to the single PSU server 412a, the single PSU server 412b, and the dual PSU server 412c, respectively, such that the SDS/PDU 416b can provide power to the single PSU server 412a, the single PSU server 412b, and the dual PSU server 412c. In addition, since the dual PSU server 412c has two power supply units, the power cord 418d may connect the dual PSU server 412a to the SDS/PDU 416a such that the SDS/PDU 416a can provide power to the dual PSU server 412a concurrently with the SDS/PDU 416b. Persons of skill in the art will understand that other power-cord configurations and connection schemes may be used without departing from the spirit and scope of this disclosure.

The SDS/PDU 416a and the SDS/PDU 416b may further function as console servers that allow administrators to access remote serial console ports on equipment such as a private branch exchange (PBX) (e.g., a private telephonic network), network storage devices, servers, routers, and other devices through an IP network. This access to serial console ports may further help the edge appliance 400 operate seamlessly with legacy systems. The adapter 419a and the adapter 419b may convert network communications from one protocol to another (e.g., Recommended Standard 232 (RS232) protocol, Integrated Services Digital Network (ISDN) protocol, Transmission Control Protocol/Internet Protocol (TCP/IP), or other types of protocols) such that network communications can flow between the SDS/PDUs 416a, 416b and the network switches 414a, 414b via the Category 5 Enhanced (Cat5e) cables 420a, 420b. Other Cat5e cables (not shown) may also be used to connect the network switches 414a, 414b and the SDS/PDUs 416a, 416b to each other or to other components if desired. A cable management raceway (not shown) may also be added to the edge appliance 400 to ensure that any of the cords or cables used in the edge appliance 400 are organized in a coherent manner. Persons of skill in the art will understand that higher grade cabling (e.g., Category 6) or other types of cabling may used in other examples.

While the edge appliance 400 is provided as one example, persons of skill in the art will recognize that there are many other configurations and combinations of hardware that may be used to make up an edge appliance that could perform the functions described herein. For example, more or fewer servers, switches, and other components of many different types could be used. Edge appliances that comprise routers, integrated access devices (IADs), edge multiplexers, single-board computers (SBCs) such as a computer-on-module (COM) that conform to industry standards (e.g., COM Express®), higher grade cabling (e.g., Category 6), or other hardware components may be used without departing from the spirit and scope of this disclosure. While many edge appliances may include x86 processors, edge appliances may also include field programmable gate arrays (FPGAs) or programmable logic controllers (PLCs). The type and number of processing elements used in any particular edge appliance may selected in accordance with any applicable spatial constraints and other parameters that may vary (e.g., the expected volume of network traffic the edge appliance may be expected to handle, the expected amount of data the edge device is expected to process, or the speed at which the edge appliance is expected to perform its functions to maintain a desired service level). Quantities and types of electronic components, such as memory (e.g., DIMMs) and storage (e.g., non-volatile solid-state drives), may also be selected for inclusion in an edge appliance based on similar considerations. Persons of skill in the art will thus recognize that the spirit and scope of this disclosure encompasses an edge appliance that operates in the manner described herein regardless of whether such an edge appliance closely matches the edge appliance 400.

Figure 5:
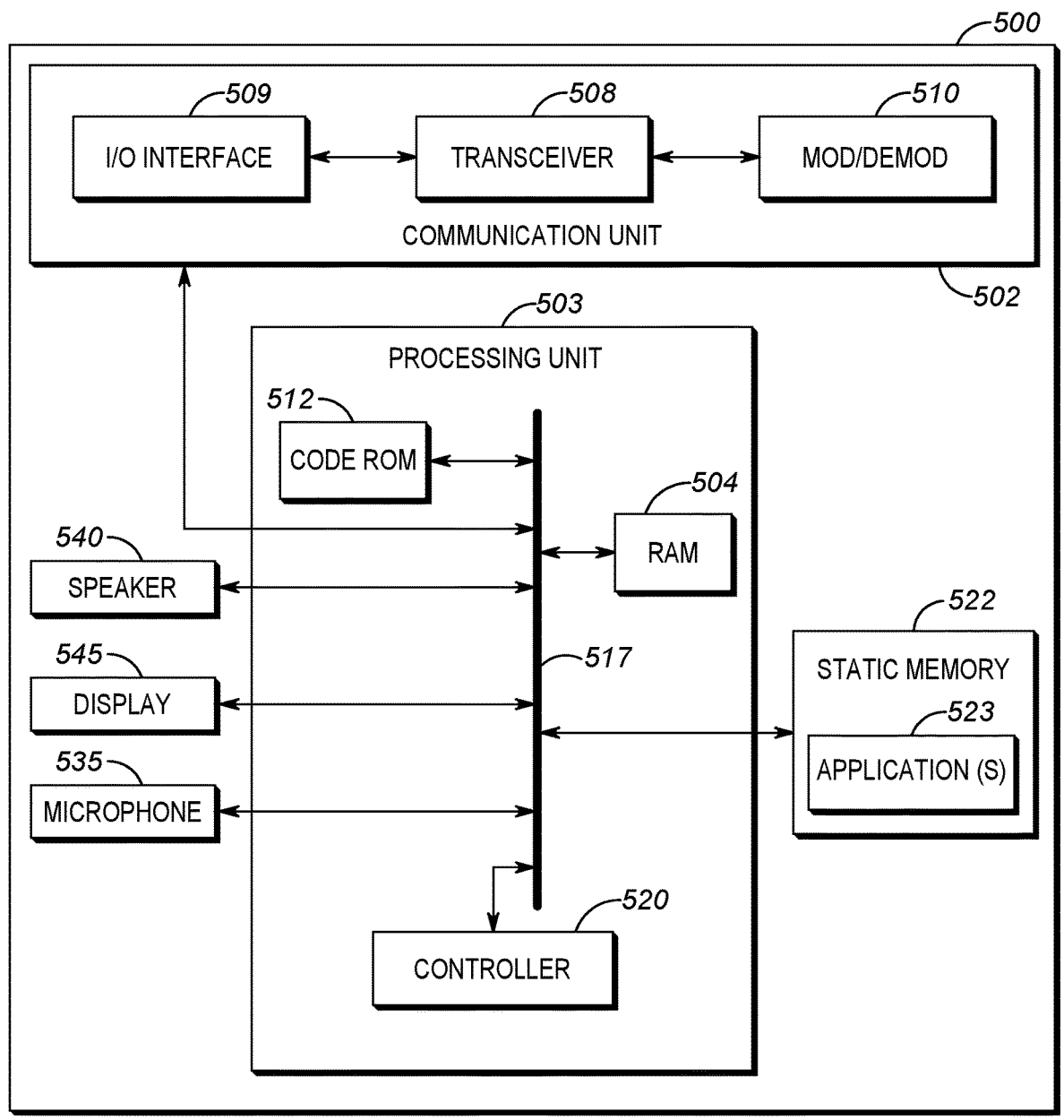
FIG. 5 illustrates a schematic block diagram of a telecommunication device, according to one example.

FIG. 5 illustrates a schematic block diagram of a telecommunication device 500, according to one example. The telecommunication device 500 may be configured to receive an emergency call routed from a CECMS to the telecommunication device via one or more different types of networks (e.g., networks with which the transceivers 508 may be adapted to communicate, as discussed in further detail below).

The telecommunication device 500 may comprise a cellular phone (e.g., a smart phone), a satellite phone, a Voice over Internet Protocol (VoIP) phone, or a computer (e.g., a workstation, a laptop, a mobile tablet or a desktop computer) that is equipped with peripherals for answering calls (e.g., a headset comprising headphones and a microphone).

As depicted, the telecommunication device 500 comprises a communication unit 502, a processing unit 503 (e.g., a processor), a Random-Access Memory (RAM) 504, one or more transceivers 508 (which may be wireless transceivers), one or more wired or wireless input/output (I/O) interfaces 509, a combined modulator/demodulator 510 (which may comprise a baseband processor), a code Read-Only Memory (ROM) 512, a common data and address bus 517, a controller 520, and a static memory 522 storing one or more applications 523.

The telecommunication device 500 may also include a speaker 540, a display 545, and a microphone 535 such that a user (e.g., a call taker) may use the telecommunication device 500 to answer calls (e.g., by listening to a caller via the speaker 540 and speaking to the caller via the microphone 535) and view output of the one or more applications 523 on the display 545.

As shown in FIG. 5, the telecommunication device 500 includes the communication unit 502 communicatively coupled to the common data and address bus 517 of the processing unit 503. The processing unit 503 may include the code Read Only Memory (ROM) 512 coupled to the common data and address bus 517 for storing data for initializing system components. The processing unit 503 may further include the controller 520 coupled, by the common data and address bus 517, to the Random-Access Memory 504 and the static memory 522. Persons of skill in the art will recognize that other configurations (e.g., configurations that include multiple buses) may also be used without departing from the spirit and scope of this disclosure.

The communication unit 502 may include one or more wired or wireless input/output (I/O) interfaces 509 that are configurable to communicate with other components and devices. For example, the communication unit 502 may include one or more transceivers 508 or wireless transceivers may be adapted for communication with one or more communication links or communication networks used to communicate with other components or computing devices. For example, the one or more transceivers 508 may be adapted for communication with one or more of the Internet (including public and private Internet Protocol (IP) networks), a private IP wide area network (WAN) including a NENA i3 Emergency services IP network (ESInet), a Bluetooth network, a Wi-Fi network, for example operating in accordance with an Institute of Electrical and Electronics Engineers (IEEE) 802.11 standard (e.g., 802.11a, 802.11b, 802.11g, 802.11ax), a 3G standard network (including Global System for Mobiles (GSM) and Code Division Multiple Access (CDMA) standards), an LTE (Long-Term Evolution) network or other types of GSM networks, a 5G (including a network architecture compliant with, for example, the Third Generation Partnership Project (3GPP)

Technical Specification (TS) 23 specification series and a new radio (NR) air interface compliant with the 3GPP TS 38 specification series) standard network, a Citizens Broadband Radio Service (CBRS), Worldwide Interoperability for Microwave Access (WiMAX) network, for example operating in accordance with an IEEE 802.16 standard, a landline telephonic network, a Low Earth Orbit (LEO) network (e.g., for satellite phones or Internet connection), a Geosynchronous Orbit (GEO) network (e.g., for satellite phones), an Evolution-Data Optimized (EV-DO) network, an Enhanced Data Rates for Global Evolution (EDGE) network, or another similar type of wireless network. Hence, the one or more transceivers 508 may include, but are not limited to, a cell phone transceiver, a Bluetooth transceiver, a CBRS transceiver, a Wi-Fi transceiver, a WiMAX transceiver, or another similar type of wireless transceiver configurable to communicate via a wireless radio network.

The one or more transceivers 508 may also comprise one or more wired transceivers, such as an Ethernet transceiver, a USB (Universal Serial Bus) transceiver, or similar transceiver configurable to communicate via a twisted pair wire, a coaxial cable, a fiber-optic link, or a similar physical connection to a wired network. The one or more transceivers 508 are also coupled to a combined modulator/demodulator 510.

The controller 520 may include ports (e.g., hardware ports) for coupling to other hardware components or systems (e.g., components and systems described in FIG. 1). The controller 520 may also comprise one or more logic circuits, one or more processors, one or more microprocessors, one or more ASIC (application-specific integrated circuits), one or more FPGA (field-programmable gate arrays), or another electronic devices.

The static memory 522 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory), or a volatile storage unit (e.g. random-access memory ("RAM")). In the example of FIG. 5, programming instructions (e.g., machine readable instructions) that implement the functional teachings of the telecommunication device 500 as described herein are maintained, persistently, at the static memory 522 and used by the controller 520, which makes appropriate utilization of volatile storage during the execution of such programming instructions.

When the controller 520 executes the one or more applications 523, the controller 520 is enabled to perform one or more of the aspects of the present disclosure set forth earlier in the present specification (e.g., the telecommunication device blocks set forth in FIGS. 2 and 3). The one or more applications 523 may include programmatic algorithms, and the like, that operable to facilitate communication between a caller and a call taker and are operable to allow the call taker to access databases, dispatch emergency response personnel, and perform other electronic functions associated with emergency response systems.

EXAMPLES

The following additional examples are included below to highlight several aspects of the systems and processes described herein. However, the scope of the disclosure is not limited to these additional examples or the other examples described herein.

Example 1 includes an edge appliance comprising: one or more processors; and a memory containing instructions thereon which, when executed by the one or more processors, cause the processors to perform a set of actions comprising: receiving, in a first format at the edge appliance via a first network from a cloud emergency call management system (CECMS), metadata indicating that a call has been routed by the CECMS to a telecommunication device that is not connected to a second network, wherein the edge appliance is connected to both the first network and the second network; generating, at the edge appliance, a virtual construct that represents the telecommunication device within the second network; generating a modified version of the metadata by converting the metadata from the first format to a second format; and transmitting, via the second network and the virtual construct, the modified version of the metadata to a call-center system connected to the second network.

Example 2 includes the edge appliance of example 1, wherein the set of actions further comprises, prior to generating the modified version of the metadata: transmitting, via the first network, an identifier that identifies the edge appliance to a configuration service; and receiving, via the first network in response to the identifier, data indicating that the call-center system connected to the second network is configured to receive the metadata in the second format.

Example 3 includes the edge appliance of example 1 or 2, wherein the set of actions further comprises: generating an additional modified version of the metadata by converting the metadata from the first format into a third format; and transmitting, via the second network, the additional modified version of the metadata to an additional call-center system connected to the second network.

Example 4 includes the edge appliance of example 1, 2, or 3, wherein the metadata comprises one or more of: a start timestamp for the call, caller identification (Caller ID) data, an indication of a caller's current geographical location, a class of telephony service for the call, a name of a telephone carrier for the call, Dual Tone Modulated Frequency (DTMF) tones dialed at a caller device, or Dial Number Identification Service (DNIS) information.

Example 5 includes the edge appliance of example 1, 2, 3, or 4, wherein the second format is a dispatch format.

Example 6 includes the edge appliance of example 1, 2, 3, 4, or 5, wherein the first network is a wide area network (WAN).

Example 7 includes the edge appliance of example 1, 2, 3, 4, 5, or 6, wherein the second network is a local area network (LAN), an enterprise network, or a private branch exchange (PBX) network.

Example 8 includes the edge appliance of example 1, 2, 3, 4, 5, 6, or 7, wherein the call-center system comprises: a recorder, a dispatch console, a private branch exchange (PBX), a camera-control system, a status-light controller, or a door controller.

Example 9 includes a method comprising: receiving, at a cloud emergency call management system (CECMS) from a caller device, an indication that a call has been initiated from the caller device; transmitting, via a first network, metadata associated with the call from the CECMS to a telecommunication device; transmitting, via the first network, a duplicate of the metadata and a media stream for the call from the CECMS to an edge appliance connected to a second network; receiving, at the CECMS via the first network, an indication that a call taker has answered the call from the telecommunication device; establishing a communication connection between the caller device and the telecommunication device, wherein the CECMS acts as network node such that media data that travels between the caller device and the telecommunication device through the communication connection is relayed through the CECMS; and transmitting a duplicate of the media data that travels between the caller device and the telecommunication device through the communication connection to the edge appliance via the first network.

Example 10 includes the method of example 9, wherein the metadata comprises one or more of: a start timestamp for the call, caller identification (Caller ID) data, an indication of a caller's current geographical location, a class of telephony service for the call, a name of a telephone carrier for the call, Dual Tone Modulated Frequency (DTMF) tones dialed at a caller device, or Dial Number Identification Service (DNIS) information.

Example 11 includes the method of example 9 or 10, further comprising: receiving, via the first network, an identifier that identifies the edge appliance to a configuration service associated with the CECMS; and transmitting, via the first network in response to receiving the identifier, data indicating that a call-center system connected to the second network is configured to receive the metadata in a specific format.

Example 12 includes the method of example 9, 10, or 11, wherein the call-center system comprises: a recorder, a dispatch console, a private branch exchange (PBX), a camera-control system, a status-light controller, or a door controller.

Example 13 includes a method comprising: receiving, in a first format at an edge appliance via a first network from a cloud emergency call management system (CECMS), metadata indicating that a call has been routed by the CECMS to a telecommunication device that is not connected to a second network, wherein the edge appliance is connected to both the first network and the second network; generating, at the edge appliance, a virtual construct that represents the telecommunication device within the second network; generating a modified version of the metadata by converting the metadata from the first format to a second format; and transmitting, via the second network and the virtual construct, the modified version of the metadata to a call-center system connected to the second network.

Example 14 includes the method of example 13, further comprising, prior to generating the modified version of the metadata: transmitting, via the first network, an identifier that identifies the edge appliance to a configuration service; and receiving, via the first network, data indicating that the call-center system connected to the second network is configured to receive the metadata in the second format.

Example 15 includes the method of example 13 or 14, further comprising: generating an additional modified version of the metadata by converting the metadata from the first format into a third format; and transmitting, via the second network, the additional modified version of the metadata to an additional call-center system connected to the second network.

Example 16 includes the method of example 13, 14, or 15, wherein the metadata comprises one or more of: a start timestamp for the call, caller identification (Caller ID) data, an indication of a caller's current geographical location, a class of telephony service for the call, a name of a telephone carrier for the call, Dual Tone Modulated Frequency (DTMF) tones dialed at a caller device, or Dial Number Identification Service (DNIS) information.

Example 17 includes the method of example 13, 14, 15 or 16, wherein the second format is a dispatch format.

Example 18 includes the method of example 13, 14, 15, 16, or 17, wherein the first network is a wide area network (WAN).

Example 19 includes the method of example 13, 14, 15, 16, 17, or 18, wherein the second network is a local area network (LAN), an enterprise network, or a private branch exchange (PBX) network.

Example 20 includes the method of example 13, 14, 15, 16, 17, 18, or 19, wherein the call-center system comprises: a recorder, a dispatch console, a private branch exchange (PBX), a camera-control system, a status-light controller, or a door controller.

Example 21 includes a non-transitory computer-readable storage medium containing instructions that, when executed by one or more processors, perform a set of actions comprising: receiving, in a first format at an edge appliance via a first network from a cloud emergency call management system (CECMS), metadata indicating that a call has been routed by the CECMS to a telecommunication device that is not connected to a second network, wherein the edge appliance is connected to both the first network and the second network; generating, at the edge appliance, a virtual construct that represents the telecommunication device within the second network; generating a modified version of the metadata by converting the metadata from the first format to a second format; and transmitting, via the second network and the virtual construct, the modified version of the metadata to a call-center system connected to the second network.

Example 22 includes the non-transitory computer-readable storage medium of example 21, wherein the set of actions further comprises, prior to generating the modified version of the metadata: transmitting, via the first network, an identifier that identifies the edge appliance to a configuration service; and receiving, via the first network, data indicating that the call-center system connected to the second network is configured to receive the metadata in the second format.

Example 23 includes the non-transitory computer-readable storage medium of example 21 or 22, wherein the set of actions further comprises: generating an additional modified version of the metadata by converting the metadata from the first format into a third format; and transmitting, via the second network, the additional modified version of the metadata to an additional call-center system connected to the second network.

Example 24 includes the non-transitory computer-readable storage medium of example 21, 22, or 23, wherein the metadata comprises one or more of: a start timestamp for the call, caller identification (Caller ID) data, an indication of a caller's current geographical location, a class of telephony service for the call, a name of a telephone carrier for the call, Dual Tone Modulated Frequency (DTMF) tones dialed at a caller device, or Dial Number Identification Service (DNIS) information.

Example 25 includes the non-transitory computer-readable storage medium of example 21, 22, 23, or 24, wherein the second format is a dispatch format.

Example 26 includes the non-transitory computer-readable storage medium of example 21, 22, 23, 24, or 25, wherein the first network is a wide area network (WAN).

Example 27 includes the non-transitory computer-readable storage medium of example 21, 22, 23, 24, 25, or 26, wherein the second network is a local area network (LAN), an enterprise network, or a private branch exchange (PBX) network.

Example 28 includes the non-transitory computer-readable storage medium of example 21, 22, 23, 24, 25, 26, or 27, wherein the call-center system comprises: a recorder, a dispatch console, a private branch exchange (PBX), a camera-control system, a status-light controller, or a door controller.

Example 29 includes a non-transitory computer-readable storage medium containing instructions that, when executed by one or more processors, perform a set of actions comprising: receiving, at a cloud emergency call management system (CECMS) from a caller device, an indication that a call has been initiated from the caller device; transmitting, via a first network, metadata associated with the call from the CECMS to a telecommunication device; transmitting, via the first network, a duplicate of the metadata and a media stream for the call from the CECMS to an edge appliance connected to a second network; receiving, at the CECMS via the first network, an indication that a call taker has answered the call from the telecommunication device; establishing a communication connection between the caller device and the telecommunication device, wherein the CECMS acts as network node such that media data that travels between the caller device and the telecommunication device through the communication connection is relayed through the CECMS; and transmitting a duplicate of the media data that travels between the caller device and the telecommunication device through the communication connection to the edge appliance via the first network.

Example 30 includes the non-transitory computer-readable storage medium of example 29, wherein the metadata comprises one or more of: a start timestamp for the call, caller identification (Caller ID) data, an indication of a caller's current geographical location, a class of telephony service for the call, a name of a telephone carrier for the call, Dual Tone Modulated Frequency (DTMF) tones dialed at a caller device, or Dial Number Identification Service (DNIS) information.

Example 31 includes the non-transitory computer-readable storage medium of example 29 or 30, wherein the set of actions further comprises: receiving, via the first network, an identifier that identifies the edge appliance to a configuration service associated with the CECMS; and transmitting, via the first network in response to receiving the identifier, data indicating that a call-center system connected to the second network is configured to receive the metadata in a specific format.

Example 32 includes the non-transitory computer-readable storage medium of example 29, 30, or 31, wherein the call-center system comprises: a recorder, a dispatch console, a private branch exchange (PBX), a camera-control system, a status-light controller, or a door controller.

Example 33 includes the edge appliance of example 1, 3, 4, 5, 6, 7, or 8, wherein the set of actions further comprises: receiving, in a first format at the edge appliance via the first network from the CECMS, media data for the call; generating a modified version of the media data by converting the media data from a first additional format to a second additional format; and transmitting, via the second network and the virtual construct, the modified version of the media data to the call-center system connected to the second network.

Example 34 includes the edge appliance of example 2, wherein the set of actions further comprises: receiving, in a first format at the edge appliance via the first network from the CECMS, media data for the call; generating a modified version of the media data by converting the media data from a first additional format to a second additional format; and transmitting, via the second network and the virtual construct, the modified version of the media data to the call-center system connected to the second network.

Example 35 includes the edge appliance of example 34, wherein the set of actions further comprises: receiving, via the first network in response to the identifier, data indicating that the call-center system connected to the second network is configured to receive the media data in the second additional format.

Example 36 includes the method of example 13, 15, 16, 17, 18, 19, or 20, further comprising: receiving, in a first format at the edge appliance via the first network from the CECMS, media data for the call; generating a modified version of the media data by converting the media data from a first additional format to a second additional format; and transmitting, via the second network and the virtual construct, the modified version of the media data to the call-center system connected to the second network.

Example 37 includes the method of example 14, further comprising: receiving, in a first format at the edge appliance via the first network from the CECMS, media data for the call; generating a modified version of the media data by converting the media data from a first additional format to a second additional format; and transmitting, via the second network and the virtual construct, the modified version of the media data to the call-center system connected to the second network.

Example 38 includes the method of example 37, further comprising: receiving, via the first network in response to the identifier, data indicating that the call-center system connected to the second network is configured to receive the media data in the second additional format.

Example 39 includes the non-transitory computer-readable storage medium of example 21, 23, 24, 25, 26, 27, or 28, wherein the set of actions further comprises: receiving, in a first format at the edge appliance via the first network from the CECMS, media data for the call; generating a modified version of the media data by converting the media data from a first additional format to a second additional format; and transmitting, via the second network and the virtual construct, the modified version of the media data to the call-center system connected to the second network.

Example 40 includes the non-transitory computer-readable storage medium of example 22, wherein the set of actions further comprises: receiving, in a first format at the edge appliance via the first network from the CECMS, media data for the call; generating a modified version of the media data by converting the media data from a first additional format to a second additional format; and transmitting, via the second network and the virtual construct, the modified version of the media data to the call-center system connected to the second network.

Example 41 includes the non-transitory computer-readable storage medium of example 40, wherein the set of actions further comprises: receiving, via the first network in response to the identifier, data indicating that the call-center system connected to the second network is configured to receive the media data in the second additional format.

Example 42 includes the method of example 11, further comprising: transmitting, via the first network to the edge appliance in response to receiving the identifier, data indicating that the call-center system connected to the second network is configured to receive the media data in an additional specific format.

Example 43 includes the non-transitory computer-readable storage medium of example 31, wherein the set of actions further comprises: further comprising: transmitting, via the first network to the edge appliance in response to receiving the identifier, data indicating that the call-center system connected to the second network is configured to receive the media data in an additional specific format.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot implement virtual constructs in computing devices, among other features and functions set forth herein).

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The claimed matter is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1%, and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling," or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some examples may comprise of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and Integrated Circuits (ICs) with minimal experimentation. For example, computer program code for carrying out operations of various examples may be written in an object oriented programming language such as Java, Smalltalk, C++, Python, or the like. However, the computer program code for carrying out operations of various examples may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

Examples are herein described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some examples, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An edge appliance comprising:
   one or more processors; and
   a memory containing instructions thereon which, when executed by the one or more processors, cause the processors to perform a set of actions comprising:
      receiving, in a first format at the edge appliance via a first network from a cloud emergency call management system (CECMS), metadata indicating that a call has been routed by the CECMS to a telecommunication device that is not connected to a second network, wherein the edge appliance is connected to both the first network and the second network;
      generating, at the edge appliance, a virtual construct that represents the telecommunication device within the second network;
      generating a modified version of the metadata by converting the metadata from the first format to a second format; and
      transmitting, via the second network and the virtual construct, the modified version of the metadata to a call-center system connected to the second network.

2. The edge appliance of claim 1, wherein the set of actions further comprises, prior to generating the modified version of the metadata:
   transmitting, via the first network, an identifier that identifies the edge appliance to a configuration service; and
   receiving, via the first network in response to the identifier, data indicating that the call-center system connected to the second network is configured to receive the metadata in the second format.

3. The edge appliance of claim 1, wherein the set of actions further comprises:
   generating an additional modified version of the metadata by converting the metadata from the first format into a third format; and
   transmitting, via the second network, the additional modified version of the metadata to an additional call-center system connected to the second network.

4. The edge appliance of claim 1, wherein the metadata comprises one or more of:
   a start timestamp for the call, caller identification (Caller ID) data, an indication of a caller's current geographical location, a class of telephony service for the call, a name of a telephone carrier for the call, Dual Tone Modulated Frequency (DTMF) tones dialed at a caller device, or Dial Number Identification Service (DNIS) information.

5. The edge appliance of claim 1, wherein the second format is a dispatch format.

6. The edge appliance of claim 1, wherein the first network is a wide area network (WAN).

7. The edge appliance of claim 1, wherein the second network is a local area network (LAN), an enterprise network, or a private branch exchange (PBX) network.

8. The edge appliance of claim 1, wherein the call-center system comprises: a recorder, a dispatch console, a private branch exchange (PBX), a camera-control system, a status-light controller, or a door controller.

9. A method comprising:
   receiving, at a cloud emergency call management system (CECMS) from a caller device, an indication that a call has been initiated from the caller device;
   transmitting, via a first network, metadata associated with the call from the CECMS to a telecommunication device;

transmitting, via the first network, a duplicate of the metadata and a media stream for the call from the CECMS to an edge appliance connected to a second network;

receiving, at the CECMS via the first network, an indication that a call taker has answered the call from the telecommunication device;

establishing a communication connection between the caller device and the telecommunication device, wherein the CECMS acts as network node such that media data that travels between the caller device and the telecommunication device through the communication connection is relayed through the CECMS; and transmitting a duplicate of the media data that travels between the caller device and the telecommunication device through the communication connection to the edge appliance via the first network.

10. The method of claim 9, wherein the metadata comprises one or more of: a start timestamp for the call, caller identification (Caller ID) data, an indication of a caller's current geographical location, a class of telephony service for the call, a name of a telephone carrier for the call, Dual Tone Modulated Frequency (DTMF) tones dialed at a caller device, or Dial Number Identification Service (DNIS) information.

11. The method of claim 9, further comprising:

receiving, via the first network, an identifier that identifies the edge appliance to a configuration service associated with the CECMS; and transmitting, via the first network in response to receiving the identifier, data indicating that a call-center system connected to the second network is configured to receive the metadata in a specific format.

12. The method of claim 11, wherein the call-center system comprises: a recorder, a dispatch console, a private branch exchange (PBX), a camera-control system, a status-light controller, or a door controller.

13. A method comprising:

receiving, in a first format at an edge appliance via a first network from a cloud emergency call management system (CECMS), metadata indicating that a call has been routed by the CECMS to a telecommunication device that is not connected to a second network, wherein the edge appliance is connected to both the first network and the second network;

generating, at the edge appliance, a virtual construct that represents the telecommunication device within the second network;

generating a modified version of the metadata by converting the metadata from the first format to a second format; and transmitting, via the second network and the virtual construct, the modified version of the metadata to a call-center system connected to the second network.

14. The method of claim 13, further comprising, prior to generating the modified version of the metadata:

transmitting, via the first network, an identifier that identifies the edge appliance to a configuration service; and receiving, via the first network, data indicating that the call-center system connected to the second network is configured to receive the metadata in the second format.

15. The method of claim 13, further comprising:

generating an additional modified version of the metadata by converting the metadata from the first format into a third format; and transmitting, via the second network, the additional modified version of the metadata to an additional call-center system connected to the second network.

16. The method of claim 13, wherein the metadata comprises one or more of: a start timestamp for the call, caller identification (Caller ID) data, an indication of a caller's current geographical location, a class of telephony service for the call, a name of a telephone carrier for the call, Dual Tone Modulated Frequency (DTMF) tones dialed at a caller device, or Dial Number Identification Service (DNIS) information.

17. The method of claim 13, wherein the second format is a dispatch format.

18. The method of claim 13, wherein the first network is a wide area network (WAN).

19. The method of claim 13, wherein the second network is a local area network (LAN), an enterprise network, or a private branch exchange (PBX) network.

20. The method of claim 13, wherein the call-center system comprises: a recorder, a dispatch console, a private branch exchange (PBX), a camera-control system, a status-light controller, or a door controller.

* * * * *